T. H. GYTON.
NON-SKID PROTECTOR.
APPLICATION FILED SEPT. 23, 1918.
1,347,368. Patented July 20, 1920.
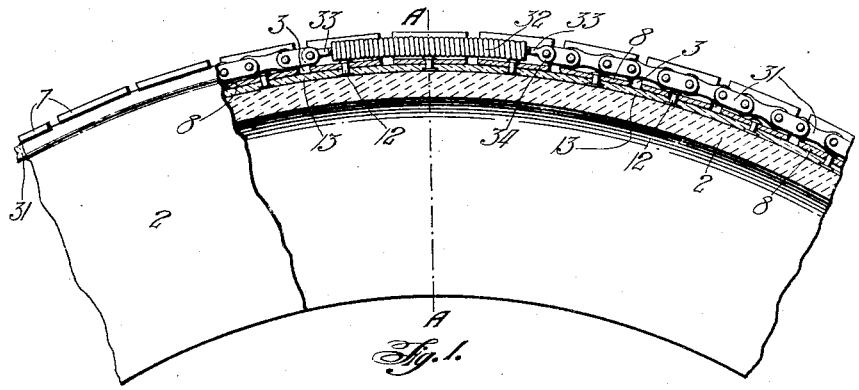
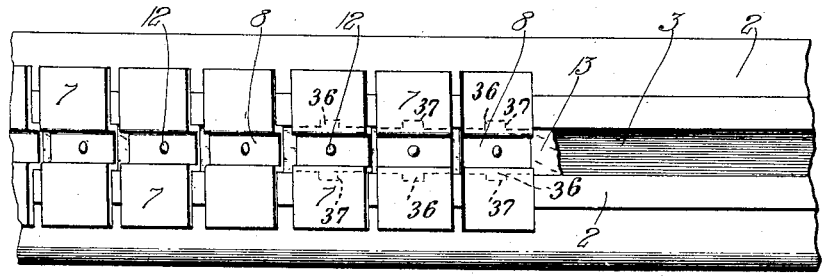
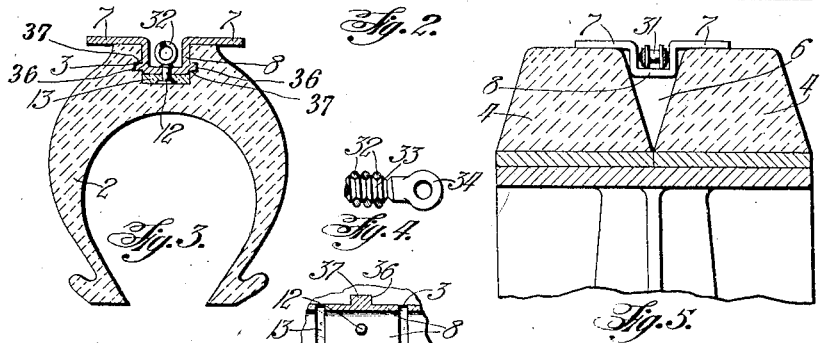
Inventor
T. H. Gyton

UNITED STATES PATENT OFFICE.

THOMAS H. GYTON, OF COLLINGWOOD, VICTORIA, AUSTRALIA.

NON-SKID PROTECTOR.

1,347,368.   Specification of Letters Patent.   Patented July 20, 1920.

Application filed September 23, 1918. Serial No. 255,375.

*To all whom it may concern:*

Be it known that I, THOMAS HENRY GYTON, a subject of the King of Great Britain and Ireland, and a resident of the postal district of Clifton Hill, city of Collingwood, in the county of Bourke, State of Victoria, Commonwealth of Australia, (whose post-office address is 162 Noone street, in the said postal district of Clifton Hill,) have invented new and useful Improvements in and Connected with Non-Skid Protectors, of which the following is a specification.

This invention relates to attachments for resilient tires, and especially to pneumatic tires of motor vehicles, whereby the tire is protected from wear or injury and skidding is minimized or prevented.

Various devices have hitherto been employed with the object in view. These have included various types of metallic armor, but a common objection to such armor has been that it prevents the free flexure of the tire against the road surface, and thus impairs its resiliency. This is in most cases due to the fact that the metallic armor or shield is curved or otherwise shaped to conform substantially to the shape of the exterior of the tire which is thus restricted in its expansion when road inequalities or obstructions are encountered.

Chains carrying various forms of non-skid devices have also been used to surround a tire.

By the present invention, the objections above stated are overcome and a cheap, simple, and effective attachment of becoming appearance is provided by the use of a series of flat metal plates which are arranged close to each other around the tread of the tire for which they form an even unrestricted track. The metal plates are suitably hinged together and are provided with what are hereinafter referred to as keepers which project from the inner faces of the plates and are accommodated by a circumferential groove in the tread of the tire, thus preventing lateral displacement of the plates. The plates are held securely against the tire by a flexible retainer consisting of a metal cord, chain or other band which is also disposed within the circumferential groove of the tire. This retainer is quite separate from the steel plates around which it passes, so that any breakage or derangement of the plates may be easily remedied without affecting the retainer and vice versa. The retainer is rendered expansible and is thus capable of accommodating itself to variations in the diameter of a tire by means of one or more springs or other elastic elements interposed in its length. It also insures the plates being kept in proper relative position on the tire and the shape and arrangement of the plates is such that sufficient air space is provided between the tire and said plates to prevent undue heating of the parts.

Referring to the drawings which form part of this specification:—

Figure 1 is a part sectional side view of portion of a pneumatic tire cover with the invention applied.

Fig. 2 is a plan of Fig. 1 the chain or flexible retainer being removed and portion of a rubberized leather strip by which the plates are hinged together being broken away for convenience of illustration.

Fig. 3 is a cross section taken on line 3—3 of Fig. 1.

Fig. 4 is a detail view showing a novel method of attaching the ends of the flexible retainer to helical springs by which the retainer is rendered expansible.

Fig. 5 is a cross section of portion of a wheel having twin solid rubber tires, showing the invention applied thereto and accommodated by the circumferential groove or space between the tires.

Fig. 6 is a detail plan view of portion of the tire tread showing how creepage of the plates may be prevented by abutments protruding into recesses in the sides of the circumferential groove of the tire.

Fig. 7 is a side sectional view taken through the middle of two of the metal plates and showing one method of hinging said plates together by means of links.

Fig. 8 is a cross section on line 8—8 of Fig. 7.

Fig. 9 is a plan of Fig. 7.

Fig. 10 shows another method of hinging the plates together.

Fig. 11 shows the hinging of the plates by means of links connected to U shaped metal strips attached to the keepers of the plates.

Fig. 12 is a plan of Fig. 11, and

Fig. 13 shows a further modification of the hinging means.

In applying the invention to a single tire such as to a pneumatic tire cover 2 (Figs. 1, 2 and 3) a circumferential groove 3 is formed around the center of the tread of the tire by any suitable means. This groove is preferably rectangular in section as shown in Fig. 3 but its shape may vary according to circumstances. It may be formed during manufacture of the tire or may be cut from or built up upon the tread of an existing tire. In the case of twin tires 4 (as in Fig. 5) the circumferential groove or space 6 which exists between the tires may take the place of the groove 3.

In combination with a tire having the circumferential groove, I employ a series of flat steel or other metal plates 7. The size and number of these plates will depend upon conditions and the dimensions of the tire to which they are to be applied. The plates are arranged in close proximity to each other and extend laterally across the tread, their width being preferably greater than the width of the actual tread surface as seen in Fig. 3, although in some cases the width of the plates may be the same as or less than the width of the tread.

Protruding from the inner face of each plate 7 and preferably formed integral therewith is a radial projection or keeper 8, which is accommodated by the circumferential groove 3 or 6. The keeper is preferably formed integral with the plate but may, if desired, be attached thereto in any well-known way. The height or depth of the keeper is preferably such that a slight air space exists between its bottom and the bottom of the groove in the tire. The sides and bottom of the keeper form within it a groove or channel which, when a series of the plates are joined together forms a circumferential channel around the tire and within the keepers. This channel accommodates the retainer hereinafter described.

The plates 7 may be hinged together in various different ways; a convenient method of connecting the plates is by securing them with rivets 12 or other means to a strip of rubberized leather or other suitable strong flexible material or fabric 13. This strip is passed around the tire inside the groove 3 and flexibly connects the plates together so that a chain of such plates is formed around the tire.

As seen in Figs. 7, 8 and 9 a gullet 14 may be formed in the keeper of each plate, said keepers being interconnected by means of links 16 which are accommodated by the gullets 14 and are retained in place by a bridge plate 17 riveted or otherwise attached to the bottom of the keeper as shown. With such a form of hinge, it is preferable to provide the keeper with inset or converging sides as at 18 (Fig. 8) so that the sides of the links 16 do not protrude beyond the sides of the keeper and therefore bed comfortably within the groove of the tire.

As seen in Fig. 10, the plates may be hinged together by a metal strap or loop 19 which passes through slots 20 formed near the ends of the keepers.

In Figs. 11 and 12 portion of each keeper bottom is removed at each end as indicated by the reference 22. U shaped metal strips 21 are then attached to the reduced bottom of the keeper by rivets or the like, links 23 passing through and interconnecting with the U shaped strips as shown.

A further embodiment of the hinging means is illustrated in Fig. 13 where bed plates 24 are attached underneath the bottoms of the keepers, said bed plates being provided with beds 26 to accommodate the connecting links 27. The beds 26 may be formed by bending the bed plate but are preferably excavated from the bed plate as shown so that the bottom of said plate presents a perfectly flat surface to the tire. The ends of the bed plates 24 may be beveled as at 28, to avoid objectionable sharp corners catching in the material of the tire.

Accommodated by the circumferential channel which is formed between the sides of the keepers is a flexible retainer 31 by which the plates 7 are held in proper position upon the tire. This retainer consists of a suitable chain (such as an ordinary bicycle chain) or other band into the length of which are introduced one or more helical springs 32 of rubber or other elastic elements which will permit the retainer to expand and accommodate itself to the inflation of the tire while always fitting tightly against the plates. A novel means of connecting the ends of the chain or band to the helical springs 32 is shown in Figs. 1 and 4 and consist of a connecting screw 33 having a thread equal in pitch to the pitch of the spring coils into which it is threaded as shown and thus securely attached to the spring end. The screws 33 may be provided with eye rings 34 at their outer ends to engage the links of the chain 31. This method of attaching the springs to the retainer is much superior to the usual method of attaching an element to the extended ends of the helical wire forming the spring as it causes a direct tension to be exerted on the center of the springs instead of on one side thereof as in the case above mentioned.

Suitable means may be employed to prevent any likelihood of the plates 7 creeping around the tire. Such means may consist of chains, straps or the like suitably connected to the plates and fastened to the rim or spoke of the wheel or in lieu of such chains or straps a series of recesses 36 (Fig. 6) may be formed in the tire at each side of the circumferential groove 3. These recesses accommodate abutments 37 which project from the sides of the keepers of selected plates and thus effectively prevent any circumferential movement or creepage of the plates around the tire.

Having now described my invention what I claim as new and desire to secure by Letters Patent is:—

1. The combination with a tire provided at its tread with an annular groove, said annular groove having laterally extending notches formed in its side walls, of a series of transverse metallic plates contacting with the tread portion of the tire and having central portions bent inwardly forming U-shaped hollow keepers extending into the annular groove, certain of said keepers having laterally extending lugs entering the notches to prevent the plates from creeping upon the tire, means arranged within the annular groove and at the bottom of the keepers to connect the plates, and means for holding the plates in the groove.

2. A non-skid protector comprising a resilient spacing member adapted to fit in an annular groove formed in the tread of a tire, a series of plates having U-shaped projections adapted to fit in the groove, said plates being secured to and held in spaced relation by the resilient spacing member, and flexible means for holding the plates in the groove to prevent centrifugal movement of said plates.

3. A non-skid protector comprising a plurality of plates formed with a U-shaped keeper adapted to fit in an annular groove in the tread of a tire a resilient spacing member having the bottom of the keeper secured thereto for holding the plates in spaced relation, and means including a yielding element fitting in the keepers and adapted to prevent centrifugal movement thereof.

In testimony whereof, I affix my signature.

T. H. GYTON.

Witness:
CECIL MCCLASTINO.